US011352979B2

(12) United States Patent
Yuen et al.

(10) Patent No.: US 11,352,979 B2
(45) Date of Patent: Jun. 7, 2022

(54) HOUSING LESS FRONT BEARING COMPARTMENT FOR GAS TURBINE ENGINE

(71) Applicant: Raytheon Technologies Corporation, Farmington, CT (US)

(72) Inventors: Yuk-Kwan Brian Yuen, Wethersfield, CT (US); Christopher T. Anglin, Manchester, CT (US); Matthew Nickerson, East Waterboro, ME (US); Daniel S. Rogers, Lyman, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 35 days.

(21) Appl. No.: 16/857,661

(22) Filed: Apr. 24, 2020

(65) Prior Publication Data

US 2021/0332775 A1 Oct. 28, 2021

(51) Int. Cl.
*F02K 3/06* (2006.01)
*F01D 9/06* (2006.01)
(Continued)

(52) U.S. Cl.
CPC .............. *F02K 3/06* (2013.01); *F01D 9/065* (2013.01); *F01D 25/162* (2013.01);
(Continued)

(58) Field of Classification Search
CPC ...... F01D 9/065; F01D 25/18–22; F02C 7/06; F02K 3/06
See application file for complete search history.

(56) References Cited

U.S. PATENT DOCUMENTS 2,635,420 A 4/1953 Jonker
3,312,448 A * 4/1967 Huil, Jr. .................. F01D 9/065
415/175

(Continued)

FOREIGN PATENT DOCUMENTS

EP 1918527 A2 5/2008
EP 2407640 A2 1/2012
(Continued)

OTHER PUBLICATIONS

"Port." Merriam-Webster.com Dictionary, Merriam-Webster, https://www.merriam-webster.com/dictionary/port. Accessed Jan. 28, 2022. (Year: 2022).*

(Continued)

*Primary Examiner* — Topaz L. Elliott
(74) *Attorney, Agent, or Firm* — Cantor Colburn LLP

(57) ABSTRACT

A fan assembly of a gas turbine engine includes a fan rotor including a fan rotor hub, and a plurality of fan blades extending radially outwardly from the fan rotor hub, and a fan case including an inner case portion and an outer case portion surrounding the plurality of fan blades. A plurality of struts extend between the inner case portion and the outer case portion. A bearing assembly is configured to support the fan rotor at the inner case portion. The bearing assembly includes a bearing inner race secured to the fan rotor, a bearing outer race secured to the inner case portion, and a plurality of bearing elements located radially between the bearing inner race and the bearing outer race.

14 Claims, 3 Drawing Sheets

(51) Int. Cl.
  *F01D 25/16* (2006.01)
  *F01D 25/18* (2006.01)

(52) U.S. Cl.
  CPC ...... *F01D 25/183* (2013.01); *F05D 2220/323* (2013.01); *F05D 2220/36* (2013.01)

(56) References Cited

U.S. PATENT DOCUMENTS

| | | | |
|---|---|---|---|
| 3,526,092 | A | 9/1970 | Steel |
| 3,528,241 | A * | 9/1970 | Gill, Jr. ................... F02C 7/06 |
| | | | 60/39.08 |
| 3,531,935 | A | 10/1970 | Poucher |
| 7,025,560 | B2 | 4/2006 | Clark |
| 9,115,598 | B2 * | 8/2015 | Van Duyn ............... F01D 25/16 |
| 2008/0063333 | A1 * | 3/2008 | Bruno .................... F01D 25/16 |
| | | | 384/494 |
| 2013/0104524 | A1 | 5/2013 | Kupratis |
| 2013/0323047 | A1 * | 12/2013 | Van Duyn ............... F01D 25/16 |
| | | | 415/229 |
| 2015/0285090 | A1 * | 10/2015 | Munsell ................. F04D 29/325 |
| | | | 415/1 |
| 2015/0330251 | A1 * | 11/2015 | Hanrahan ................ F01D 1/18 |
| | | | 415/1 |
| 2019/0285119 | A1 | 9/2019 | Colson et al. |
| 2020/0018181 | A1 | 1/2020 | Brault et al. |
| 2020/0141281 | A1 * | 5/2020 | Ikeguchi ................ F01D 25/32 |

FOREIGN PATENT DOCUMENTS

| | | | | |
|---|---|---|---|---|
| EP | 3587774 | A1 * | 1/2020 | .............. F02K 3/06 |
| EP | 3708791 | A1 | 9/2020 | |
| FR | 3075875 | A1 | 6/2019 | |
| GB | 957616 | A | 2/1961 | |
| GB | 2046365 | A | 11/1980 | |
| JP | 2017096268 | A * | 6/2017 | .............. F02C 3/10 |
| WO | WO-9704218 | A1 * | 2/1997 | .......... F01D 25/162 |

OTHER PUBLICATIONS

European Search Report for European Application No. 21168710.8, dated Oct. 15, 2021, 9 pages.

* cited by examiner

HOUSING LESS FRONT BEARING COMPARTMENT FOR GAS TURBINE ENGINE

BACKGROUND

Exemplary embodiments of the present disclosure pertain to the art of gas turbine engines, and in particular to bearing systems for gas turbine engines.

Gas turbine engines typically utilize several bearing systems to radially and axially support shafts, rotors and other rotating components relative to stationary components of the gas turbine engine. For example, the front bearing assembly, also referred to as the Number 1 bearing assembly, locates and supports the front of the fan rotor. The bearing assembly is located in a separate bearing housing installed into the fan case, with the fan rotor also installed in the fan case. The bearing housing is rigidly secured to the fan case by a set of studs, nuts, and pins extending between the fan case and flanges on the bearing housing.

The interface between the bearing housing and the fan case creates several problems. The two components tend to separate from each other because the interface creates a thermal barrier between them. This problem is exacerbated by the cool air that flows around the fan case and the warm oil flowing to the bearing housing. To keep the separation from occurring, the flanges on the bearing housing must have an interference fit to the fan case of such magnitude to avoid separation of the radial connection due to differential thermal expansion between components or due to applied engine operation loads. The interference fit increases complexity of assembly as one component must be heated and the other cooled to overcome the interference and allow for the bearing housing to be installed into the fan case.

The thermal barrier also leads to the bearing housing "walking" or axially translating out of the fan case. Repeated heating and cooling between the two components may lead the two parts to slide against each other. The studs and nuts that attach the fan case to the bearing housing must resist this force to prevent the "walking". Further, the flanges that the studs and nuts attach to have to be very thick to avoid metal fatigue. Because the thermal conditions require the interference fit, they create a need for heavy features, such as the flanges. The purpose of the bearing housing is to support the bearing but the majority of the bearing housing serves to secure the bearing housing to the fan case and keep the bearing housing secured to the fan case, overcoming the effects of the thermal mismatch and engine operating loads.

Further, the overall size of the bearing housing has a performance impact on the engine. The inlet of the fan is restricted by the radial size of the front bearing assembly. A radially smaller front bearing assembly will allow more air to enter the engine and provide more thrust.

BRIEF DESCRIPTION

In one embodiment, a fan assembly of a gas turbine engine includes a fan rotor including a fan rotor hub, and a plurality of fan blades extending radially outwardly from the fan rotor hub, and a fan case including an inner case portion and an outer case portion surrounding the plurality of fan blades. A plurality of struts extend between the inner case portion and the outer case portion. A bearing assembly is configured to support the fan rotor at the inner case portion. The bearing assembly includes a bearing inner race secured to the fan rotor, a bearing outer race secured to the inner case portion, and a plurality of bearing elements located radially between the bearing inner race and the bearing outer race.

Additionally or alternatively, in this or other embodiments the bearing outer race is secured to a radially inner surface of the inner case portion of the fan case.

Additionally or alternatively, in this or other embodiments an oil supply tube extending through a first strut of the plurality of struts. The oil supply tube includes an oil jet nozzle to direct lubricant onto the bearing assembly.

Additionally or alternatively, in this or other embodiments the oil jet nozzle is located aftward of the plurality of bearing elements.

Additionally or alternatively, in this or other embodiments the first strut is a vertically topmost strut of the plurality of struts.

Additionally or alternatively, in this or other embodiments an oil return feature is located at a second strut of the plurality of struts and is configured to collect used lubricant and direct the used lubricant away from the bearing assembly.

Additionally or alternatively, in this or other embodiments the oil return feature includes a plurality of oil return ports extending through the second strut.

Additionally or alternatively, in this or other embodiments a first oil return ports of the plurality of oil return ports is located axially forward of the plurality of bearing elements, and at least a second oil return port of the plurality of oil return ports is located axially aft of the plurality of bearing elements.

Additionally or alternatively, in this or other embodiments the first oil return port has a smaller cross-sectional area than the second oil return port.

Additionally or alternatively, in this or other embodiments at least one sealing structure prevents contamination entry into and oil leakage from the bearing assembly.

In another embodiment, a gas turbine engine includes a combustor, a turbine driven by combustion gases output from the combustor, and a fan assembly. The fan assembly includes a fan rotor driven by the turbine including a fan rotor hub and a plurality of fan blades extending radially outwardly from the fan rotor hub, and a fan case including an inner case portion and an outer case portion surrounding the plurality of fan blades. A plurality of struts extend between the inner case portion and the outer case portion. A bearing assembly is configured to support the fan rotor at the inner case portion. The bearing assembly includes a bearing inner race secured to the fan rotor, a bearing outer race secured to the inner case portion, and a plurality of bearing elements located radially between the bearing inner race and the bearing outer race.

Additionally or alternatively, in this or other embodiments the bearing outer race is secured to a radially inner surface of the inner case portion of the fan case.

Additionally or alternatively, in this or other embodiments an oil supply tube extends through a first strut of the plurality of struts. The oil supply tube includes an oil jet nozzle to direct lubricant onto the bearing assembly from a radially outward side of the bearing assembly.

Additionally or alternatively, in this or other embodiments the oil jet nozzle is located aftward of the plurality of bearing elements.

Additionally or alternatively, in this or other embodiments the first strut is a vertically topmost strut of the plurality of struts.

Additionally or alternatively, in this or other embodiments an oil return feature is located at a second strut of the plurality of struts, and is configured to collect used lubricant and direct the used lubricant away from the bearing assembly.

Additionally or alternatively, in this or other embodiments the oil return feature includes a plurality of oil return ports extending through the second strut.

Additionally or alternatively, in this or other embodiments a first oil return ports of the plurality of oil return ports is located axially forward of the plurality of bearing elements, and at least a second oil return port of the plurality of oil return ports is located axially aft of the plurality of bearing elements.

Additionally or alternatively, in this or other embodiments the first oil return port has a smaller cross-sectional area than the second oil return port.

Additionally or alternatively, in this or other embodiments at least one sealing structure prevents contamination entry into and oil leakage from the bearing assembly.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
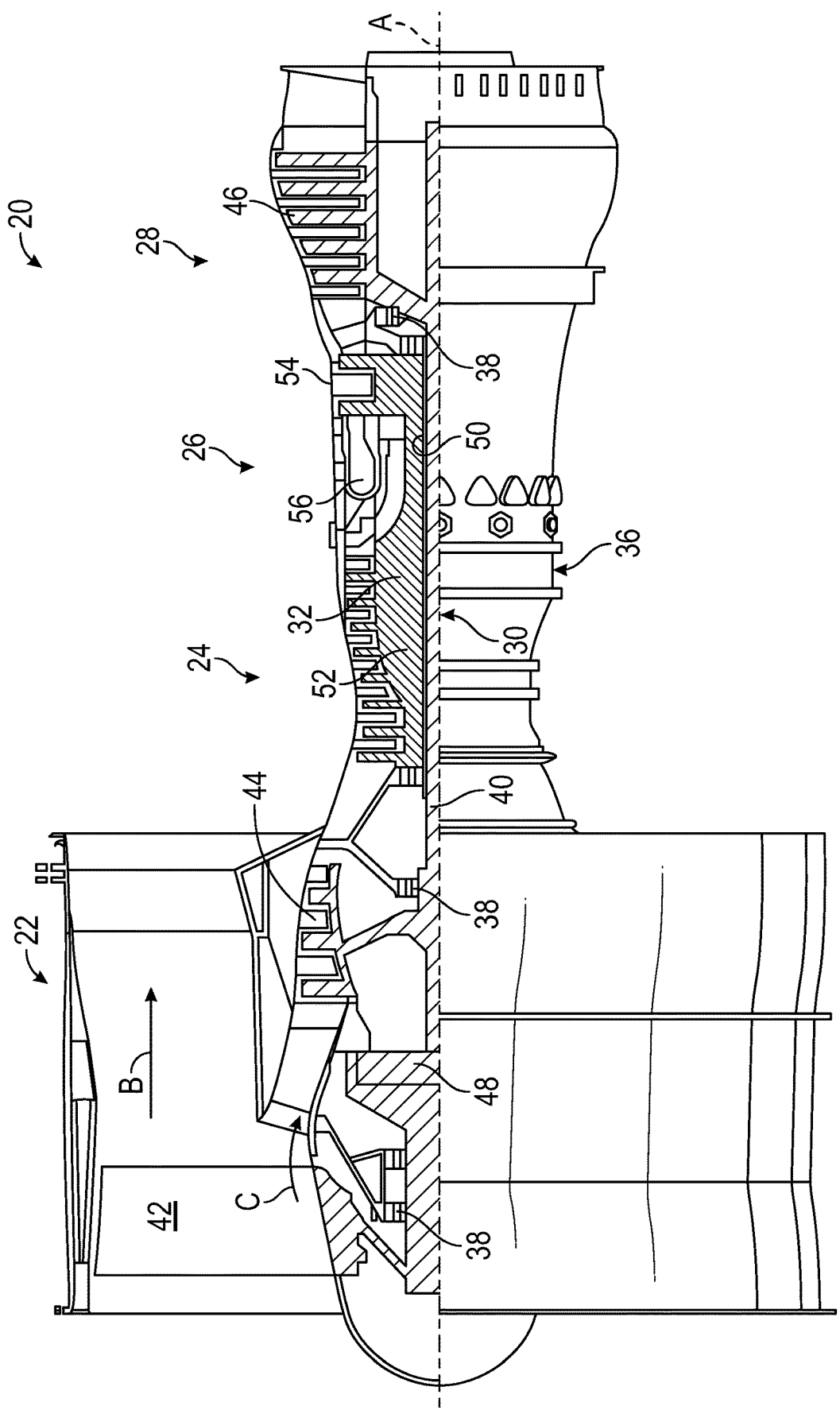
FIG. 1 is a partial cross-sectional view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicyclic gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

Figure 2:
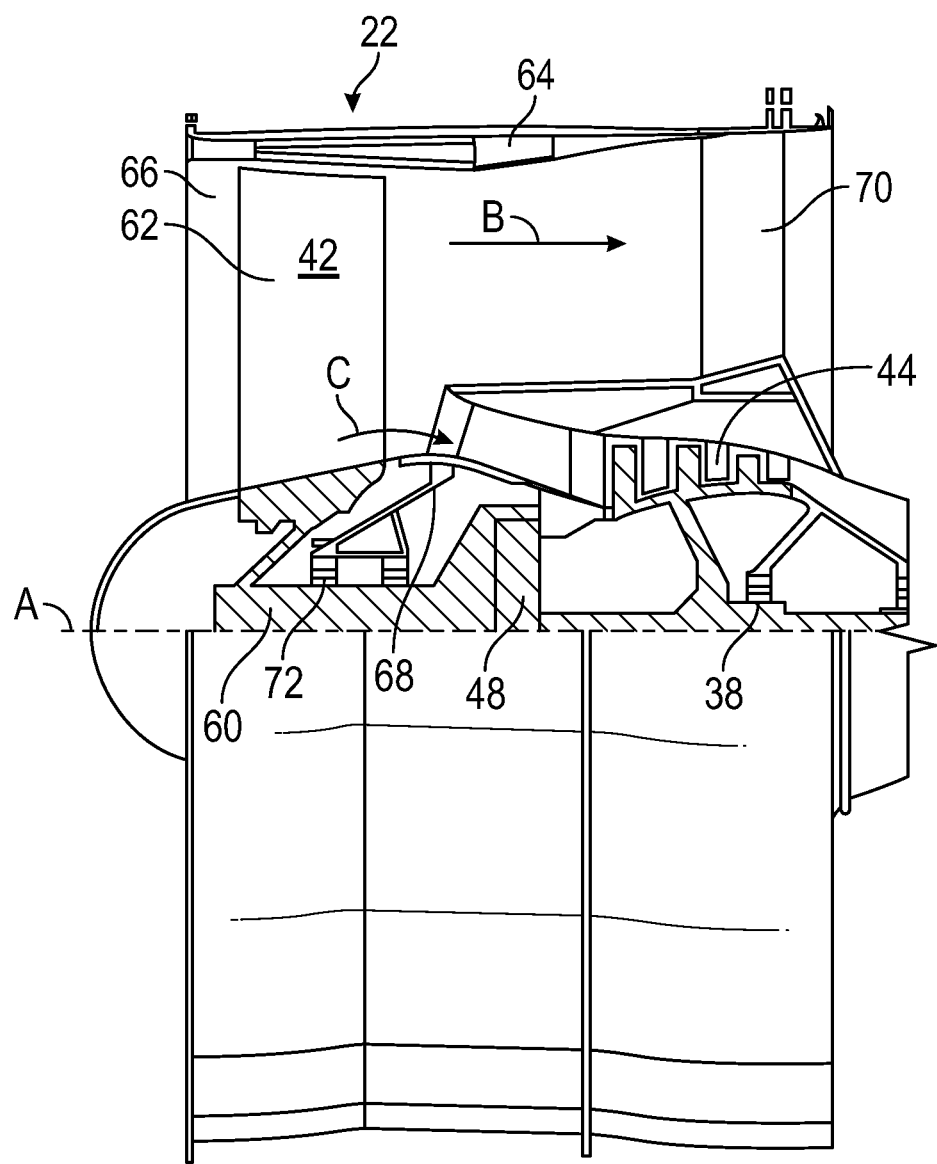
FIG. 2 is a partial cross-sectional view of an embodiment of a fan section of a gas turbine engine.

Referring now to FIG. 2, illustrated is a schematic view of a fan section 22 of the gas turbine engine 20. The fan 42 includes a fan hub 60 located at the engine central longitudinal axis A and a plurality of fan blades 62 extending radially outwardly from the fan hub 60. The fan 42 is located in a fan case 64. The fan case 64 includes an outer case portion 66 that is located radially outboard of and surrounds the fan 42, and an inner case portion 68, with a plurality of struts 70 extending between the inner case portion 68 and the outer case portion 66. A front bearing assembly 72 locates and supports the fan 42 at the fan case 64.

Figure 3:
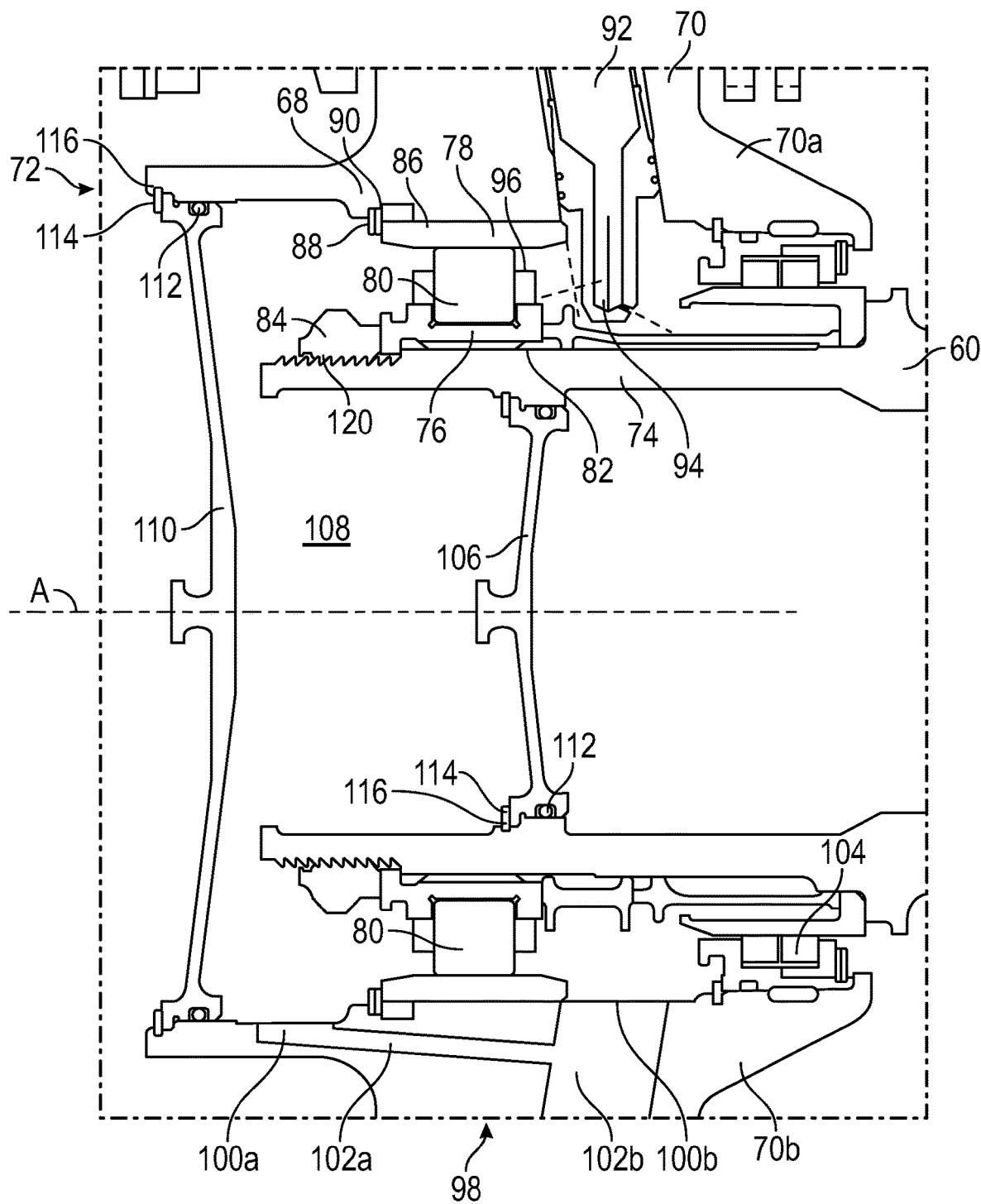
FIG. 3 is a partial cross-sectional view of an embodiment of a front bearing assembly of a fan section of a gas turbine engine.

Referring to FIG. 3, an illustration of an embodiment of a front bearing assembly 72 is illustrated. The fan hub 60 extends axially forward from the plurality fan blades 62, with momentary reference to FIG. 2, along the engine central longitudinal axis A to define a fan shaft 74. The front bearing assembly 72 as illustrated is not disposed in a separate housing as in prior art bearing assemblies, but is position directly between the fan shaft 74 and the inner case portion 68 of the fan case 64. The bearing assembly 72 has a bearing inner race 76 and a bearing outer race 78 located radially outboard of the bearing inner race 76 relative to the engine central longitudinal axis A, with one or more bearing elements 80 located between the bearing inner race 76 and the bearing outer race 78.

The bearing inner race 76 is affixed to an outer surface 82 of the fan shaft 74, and is located in a select axial position by, for example, a lock nut 84 installed to a threaded portion 120 of the fan shaft 74. The bearing outer race 78 is located at an inner surface 86 of the inner case portion 68 of the fan case 64, and secured thereto. In some embodiments, the bearing outer race 78 is secured directly to the inner surface 86, and in still other embodiments the bearing outer race 78 is formed integral to the fan case 64 at the inner surface 86. The bearing outer race 78 is radially located by a position of the inner surface 86, and may be axially located and retained by, for example, one or more retaining rings 88 installed into a retaining groove 90 formed in the inner case portion 68 of fan case 64. It is to be appreciated, however, that such a configuration is merely exemplary and the bearing outer race 78 may be axially located by other means.

Lubricant such as oil is delivered to the bearing assembly 72 from an oil feed tube 92 extending through a first strut 70a of the fan case 64. An oil jet nozzle 94 is integrated into the oil feed tube 92, and sprays oil onto the bearing assembly 72 from outboard the fan shaft 74, in contrast to prior art schemes where oil is delivered to the bearing assembly from radially inboard of the fan shaft. In some embodiments, the oil jet nozzle 94 is located axially aft of the bearing assembly 72. This concentrates oil flow on an aft side 96 of the one or more bearing elements 80. In some embodiments, the first strut 70a through which the oil feed tube 92 extends through is a vertically top most strut 70 of the plurality of struts 70. It is to be appreciated that in other embodiments, the first strut 70a may be in other locations, and further that multiple oil feed tubes 92 extending through multiple first struts 70a of the plurality of struts 70 may be utilized.

The used oil is scavenged from the bearing assembly 72 at one or more oil returns 98 located at a second strut 70b of the plurality of struts 70. In some embodiments, the second strut 70b is located at a bottommost strut 70 of the plurality of struts 70. It is to be appreciated that in other embodiments, the second strut 70b may be in other locations, and further that multiple oil returns 98 extending through multiple second struts 70b of the plurality of struts 70 may be utilized.

In the illustrated embodiment, the oil return 98 includes a plurality of oil return ports 100a, 100b, located at the inner surface 86. Each oil return port 100a, 100b is connected to a respective oil return pathway 102a, 102b through which the scavenged oil is conveyed away from the bearing assembly 72. A first oil return port 100a is located axially forward of the bearing elements 80, while a second oil return port 102b is located rearward of the plurality of bearing elements 80.

To close the bearing assembly 72 and prevent contamination or leakage of oil therefrom the bearing assembly 72 includes an aft seal assembly 104 located rearward of the bearing elements 80. The bearing assembly 72 further includes a shaft cover 106 installed at, for example, an interior 108 of the fan shaft 74, which prevents oil intrusion into the interior 108 of the fan shaft 74. Further, a case cover 110 is installed at the inner surface 86, forward of the bearing assembly 72, and acts to seal a front side of the bearing assembly 72 to prevent contaminant entry into and/or oil leakage from a forward side of the bearing assembly 72. The shaft cover 106 and case cover 110 may include seals, for example, O-ring seals 112, to improve sealing around the shaft cover 106 and case cover 110. Further, the shaft cover 106 and/or the case cover 110 may be retained in position by a retaining ring 114 inserted into a retaining groove 116 as shown in FIG. 3.

The bearing assembly 72, without a traditional bearing housing, provides several benefits. Without the housing, the thermal barrier common in prior art systems is removed. Thus, there is no longer a need to have a difficult-to-remove and difficult-to-assemble interference fit. The weight of the bearing assembly 72 is reduced, due to removal of the typical flanges on the fan case, and removal of the housing. Further, typical fasteners that connect the housing to the fan case are no longer needed. Removal of the housing further allows for reduction is radius of the inner case portion of the fan case, thus an effective inlet area between the inner case portion and the outer case portion allows for more air to be flowed across the fan, resulting in an increase in thrust of the gas turbine engine.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fan assembly of a gas turbine engine, comprising:
   a fan rotor including:
      a fan rotor hub; and
      a plurality of fan blades extending radially outwardly from the fan rotor hub;
   a fan case including:
      an inner case portion;
      an outer case portion surrounding the plurality of fan blades; and
      a plurality of struts extending between the inner case portion and the outer case portion;
   a bearing assembly configured to support the fan rotor at the inner case portion, the bearing assembly including:
      a bearing inner race secured to the fan rotor;

a bearing outer race secured to the inner case portion; and a plurality of bearing elements located radially between the bearing inner race and the bearing outer race; and an oil return feature located at a first strut of the plurality of struts, configured to collect used lubricant and direct the used lubricant away from the bearing assembly;

wherein the oil return feature includes a plurality of oil return ports extending through the first strut wherein a first oil return port of the plurality of oil return ports is located axially forward of the plurality of bearing elements, and at least a second oil return port of the plurality of oil return ports is located axially aft of the plurality of bearing elements.

2. The fan assembly of claim 1, wherein the bearing outer race is secured to a radially inner surface of the inner case portion of the fan case.

3. The fan assembly of claim 1, further comprising an oil supply tube extending through a first second strut of the plurality of struts, the oil supply tube including an oil jet nozzle to direct lubricant onto the bearing assembly.

4. The fan assembly of claim 3, wherein the oil jet nozzle is located aftward of the plurality of bearing elements.

5. The fan assembly of claim 3, wherein the first second strut is a vertically topmost strut of the plurality of struts.

6. The fan assembly of claim 1, wherein the first oil return port has a smaller cross-sectional area than the second oil return port.

7. The fan assembly of claim 1, further comprising at least one sealing structure to prevent contamination entry into and oil leakage from the bearing assembly.

8. A gas turbine engine, comprising:
a combustor;
a turbine driven by combustion gases output from the combustor; and
a fan assembly, including:
a fan rotor driven by the turbine including:
a fan rotor hub; and
a plurality of fan blades extending radially outwardly from the fan rotor hub;
a fan case including:
an inner case portion;
an outer case portion surrounding the plurality of fan blades;
a plurality of struts extending between the inner case portion and the outer case portion;
a bearing assembly configured to support the fan rotor at the inner case portion, the bearing assembly including:
a bearing inner race secured to the fan rotor
a bearing outer race secured to the inner case portion; and
a plurality of bearing elements located radially between the bearing inner race and the bearing outer race; and
an oil return feature located at a first strut of the plurality of struts, configured to collect used lubricant and direct the used lubricant away from the bearing assembly;
wherein the oil return feature includes a plurality of oil return ports extending through the first strut wherein a first oil return port of the plurality of oil return ports is located axially forward of the plurality of bearing elements, and at least a second oil return port of the plurality of oil return ports is located axially aft of the plurality of bearing elements.

9. The gas turbine engine of claim 8, wherein the bearing outer race is secured to a radially inner surface of the inner case portion of the fan case.

10. The gas turbine engine of claim 8, further comprising an oil supply tube extending through a first second strut of the plurality of struts, the oil supply tube including an oil jet nozzle to direct lubricant onto the bearing assembly from a radially outward side of the bearing assembly.

11. The gas turbine engine of claim 10, wherein the oil jet nozzle is located aftward of the plurality of bearing elements.

12. The gas turbine engine of claim 10, wherein the second strut is a vertically topmost strut of the plurality of struts.

13. The gas turbine engine of claim 8, wherein the first oil return port has a smaller cross-sectional area than the second oil return port.

14. The gas turbine engine of claim 8, further comprising at least one sealing structure to prevent contamination entry into and oil leakage from the bearing assembly.

* * * * *